Jan. 30, 1945. C. B. SCHNEIBLE 2,368,263
SEPARATION OF SOLIDS IN A MEDIUM
Filed April 24, 1941 2 Sheets-Sheet 2

Inventor:
Claude B. Schneible,
By Dawson, Ooms & Booth,
Attorneys

Patented Jan. 30, 1945

2,368,263

UNITED STATES PATENT OFFICE 2,368,263

SEPARATION OF SOLIDS IN A MEDIUM

Claude B. Schneible, Detroit, Mich.

Application April 24, 1941, Serial No. 390,073

2 Claims. (Cl. 183—34)

This invention relates to the separation of solids in a medium, and more particularly to a method and apparatus for separating or recovering solids from a medium. It is particularly useful in treating a gaseous medium. The method and apparatus are also particularly well adapted for treating a hot gaseous medium, such as heated gases flowing from the stack of a cupola, blast furnace, cement furnace, etc.

An object of the invention is to provide simple and effective apparatus and means for treating solids-laden mediums for the rapid separation of the solids from the main body of the mediums. A further object is to provide a method and means for treating heated gases to remove solids therefrom. A further object is to provide means whereby hot gases containing solids may be treated by filtering. Other specific objects and advantages will appear as the specification proceeds.

Figure 1:
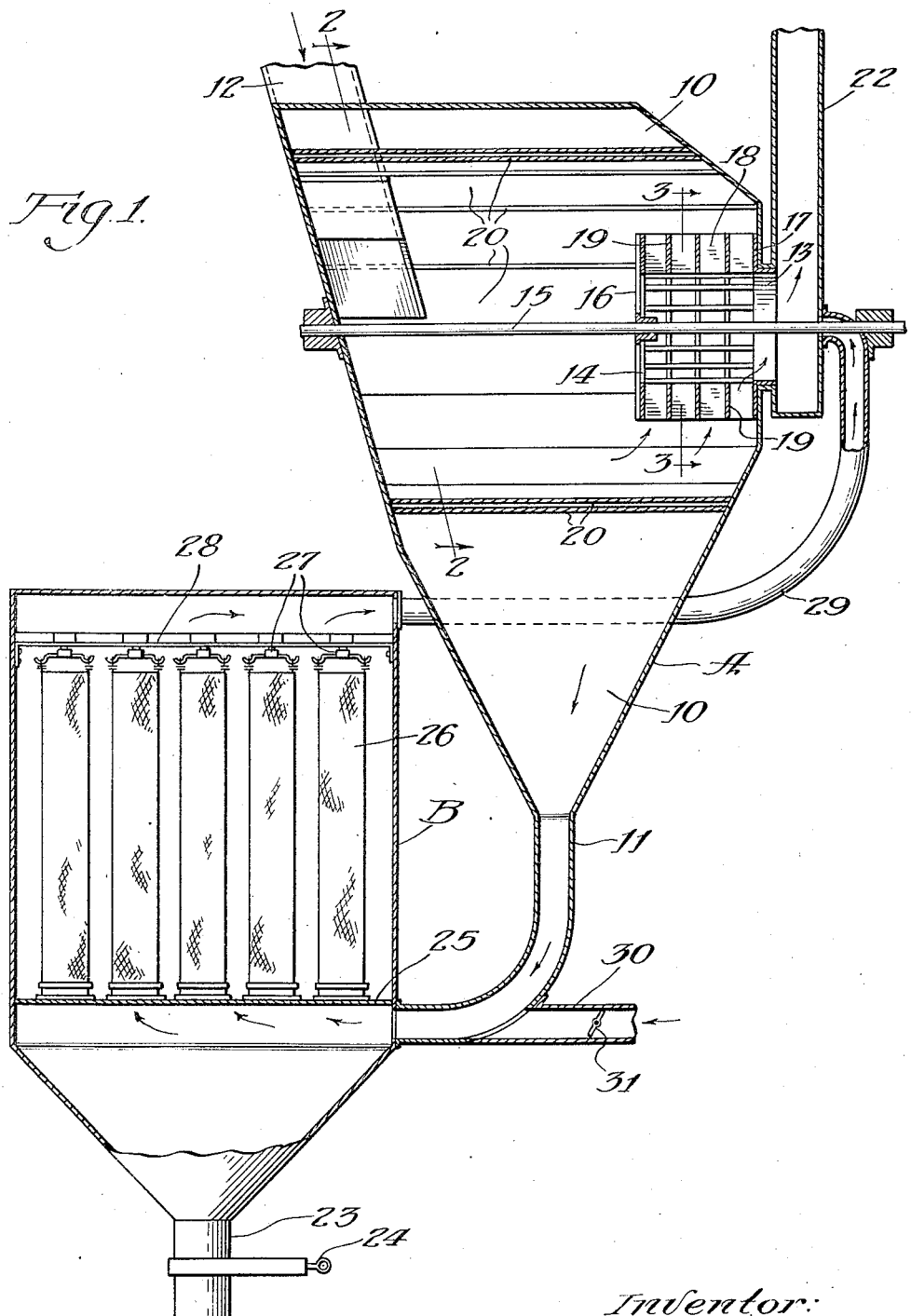
Figure 2:
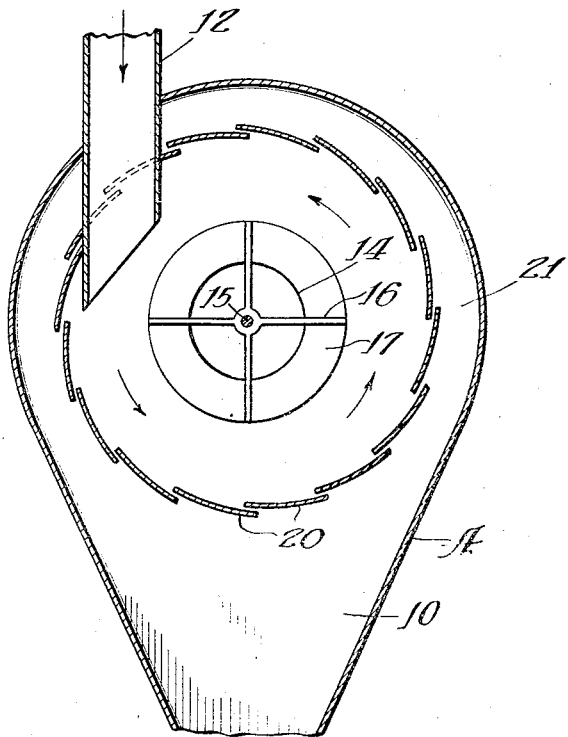
Figure 3:
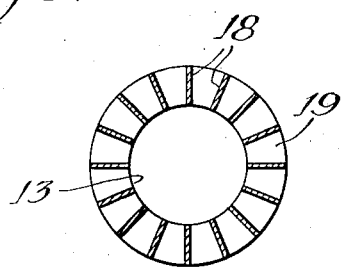

The invention is illustrated in the accompanying drawings, in which Fig. 1 is a vertical sectional view of the device of the invention; Fig. 2 is a transverse sectional view taken along the line 2—2 of Fig. 1; and Fig. 3 is a transverse sectional view taken along the line 3—3 of Fig. 1.

In the illustration given, A designates a separator apparatus for the removal of solids from the main body of the medium, and B, a filtering apparatus.

The apparatus A may be of any suitable construction or shape. While I have shown a casing of a certain shape, it will be understood that wide variations may be made therein while still using the features of the invention which will be pointed out. In the illustration given, the casing A provides a large closed chamber 10 which tapers toward a restricted outlet 11 at the bottom thereof. The outlet 11 is designed to receive the solids in concentrated form, together with a portion of the medium.

An inlet 12 is provided in the upper portion of the casing and it opens tangentially within the central portion of the chamber. Along one side of the chamber is shown an outlet 13 through which medium, which has been to a great extent separated from the solids, is withdrawn. As a guard for the medium, I provide a refuser wheel 14, which is mounted upon shaft 15. The shaft 15 is driven by any suitable source of power (not shown).

The refuser wheel may be of any suitable construction designed for the throwing outwardly of solid particles while at the same time permitting the inflow of medium freed from solids therethrough and into the outlet 13. The specific form of refuser wheel shown consists of a solid front plate 16 and rear plate 17, to which are secured transverse vanes 18. Spaced between the plates 16 and 17 and parallel therewith are a number of radial vanes 19. The gaseous medium flows through the side ports of the wheel, as illustrated in Fig. 1, and thence into the outlet 13. It will be noted that the radial vanes 19 prevent the solids from being drawn directly toward the outlet and, instead, serve as a barrier and enable them to be more easily drawn outwardly.

It will be understood that a rotating annulus of medium, substantially parallel with the refuser wheel 14, is produced within the casing, as indicated by arrows in Fig. 2. This annulus may be produced by the refuser wheel alone or by the refuser wheel in conjunction with the tangential inlet 12. It will be understood, however, that the inlet 12 need not be tangential because the force of the refuser wheel itself is sufficient to produce the annulus of air.

Along the outskirts of the rotating annulus of air, I provide skimmer louvers 20 which, as indicated in Fig. 2, catch the outer portion of the annulus and deflect this portion of the medium outwardly into the passage exterior to the louvers. In the exterior passage, which may be indicated by the numeral 21, the speed of movement is reduced and the heavier particles fall along with some of the medium into the bottom portion of chamber 10 from whence they are drawn into outlet 11.

It will be understood that communicating with the outlet 13 of casing A, there is a suction passage 22 communicating with any suitable source of suction (not shown). Under the influence of suction within this passage, medium is drawn toward the outlet 13, but due to the rotation of the guard or refuser wheel 14, only the lighter portion of the medium, which is freed from the solids, is able to escape through the outlet.

The filtering apparatus B may be of any suitable construction. If desired, apparatus like that shown in my Patent No. 2,014,298 may be employed. It will be understood, however, that it is not necessary that any particular form of filtering bag or means be used. The apparatus B consists of a casing providing a chamber, the bottom portion of which is tapered to provide an outlet 23. A closure valve 24 controls the withdrawal of solids. A head plate 25 extends across an intermediate portion of the casing, the head being provided with openings communicating with the interior of cloth filter bags 26. The filter bags are secured about the plate 25 and at the top are suspended upon spring supports 27 similar to those shown in my Patent No. 2,014,298, the spring supports 27 in turn being carried by a cross beam structure 28. A return pipe 29 establishes communication between the upper portion of the casing B and the suction pipe 22.

In order to cool the heated gases passing out of chamber 10, I provide means for introducing fresh or cooled air into the withdrawn material. If desired, the heated gases may be brought into contact with the cooling air for a distance sufficient to produce a thorough mixing thereof and a cooling of the heated gases. For the purpose of illustration, I show an inlet pipe 30 controlled by a damper 31 through which a cooling medium is introduced into the withdrawn gaseous medium.

Any suitable means for creating a suction in the upper portion of casing B may be employed. For the purpose of simplicity in structure and also for enabling all the medium to be recovered at one place, the connecting pipe 29 is employed for leading the filtered medium back to the suction pipe 22.

It will be understood that means for shaking the filter bags to produce removal of solids and any other desirable means for use in connection with the filtering of the medium, may be employed.

Operation

In the operation of the device, the medium, which may be hot or at any temperature, is introduced into the main casing A and under the influence of the refuser wheel 14 forms a rotating annulus within the skimmer louvers 20. The medium is drawn toward the outlet 13 by means of the suction within pipe 22. The admission of solids, however, is resisted by the refuser wheel 14, which tends to throw out the solid particles, allowing only the lighter medium substantially free of solids to pass through outlet 13. At the same time, the skimmer louvers constantly work to eliminate the heavier portions of the medium, thereby concentrating the solids more and more within the outer passage 21 where, under the influence of reduced motion, they tend to sink toward the discharge outlet 11. The gases then pass through the filtering apparatus B, the medium being returned through pipe 21 to suction pipe 22 and the solids being withdrawn through discharge pipe 23. In the treatment of the heated medium, air is introduced through intake 30 in sufficient volume to cool down the gases to a temperature which will not cause injury to the filtering bags 26. The cooled gases pass through the bags 26, leaving the solids to be collected and removed through outlet 23.

While I have shown one complete arrangement by which a complete treating operation can be carried out, it will be understood that the invention applies to separate operations and apparatus and that such separate steps and apparatus may be used in entirely different arrangements and in conjunction with other apparatus. The foregoing description has been given for the purpose of illustration and it will be understood that those skilled in the art may readily modify the details and steps therein without departing from the spirit of my invention.

I claim:

1. In apparatus for recovering solids from the main body of a hot gaseous medium in which they are carried, a casing provided with two outlets, means for withdrawing medium from one of said outlets without withdrawing a proportional amount of solids, means for concentrating the solids in said medium in the casing, means for withdrawing the solids suspended in hot gaseous medium through the other of said outlets, means for introducing cool air into said withdrawn solids and the hot gaseous medium carrying the same, filter material, and means for passing the mixture of solids and medium through filter material to separate the solids from the medium.

2. In apparatus for recovering solids from the main body of a hot gaseous medium in which they are carried, a casing, provided with two outlets, means for withdrawing medium from one of said outlets without withdrawing a proportional amount of solids, means for concentrating the solids in said medium in the casing, means for withdrawing the solids suspended in hot gaseous medium through the other of said outlets, means for introducing cool air into said withdrawn solids and the hot gaseous medium carrying the same, filter material, and means for passing the mixture of solids and medium through filter material to separate the solids from the medium, and means for returning the medium separated by said filter material to said first-mentioned outlet.

CLAUDE B. SCHNEIBLE.